No. 774,715.

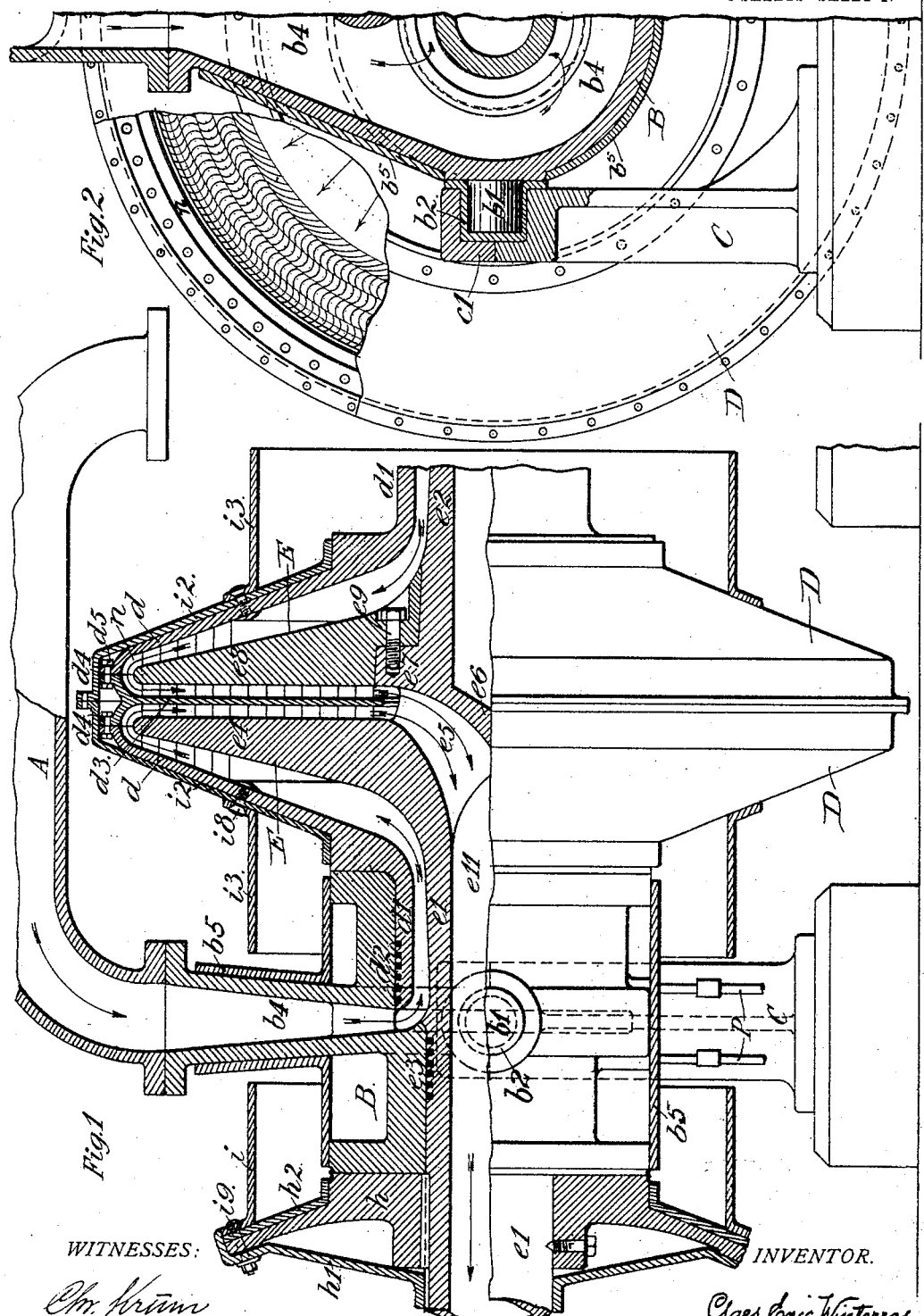

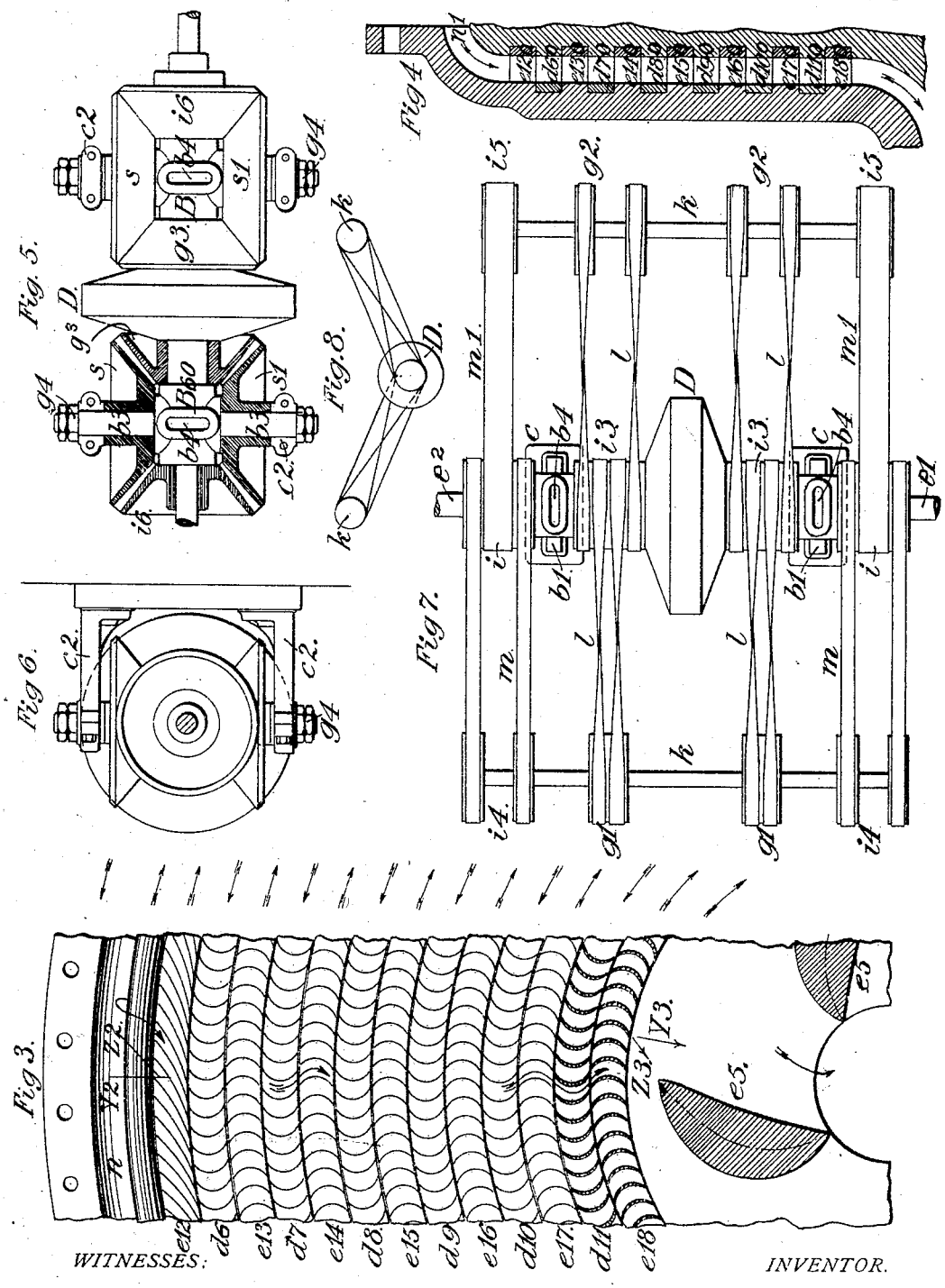

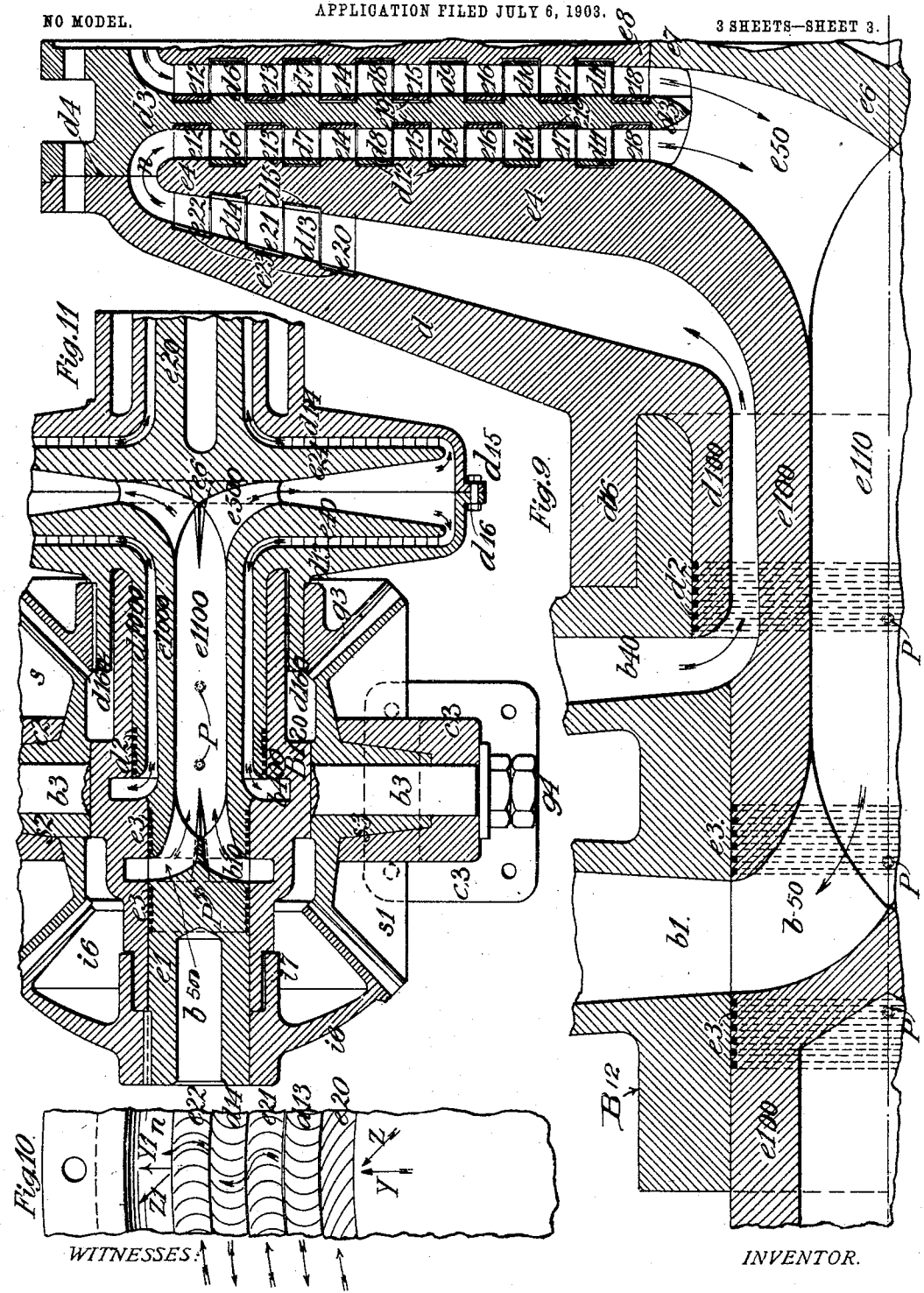

Patented November 8, 1904.

UNITED STATES PATENT OFFICE.

CLAES ERIC WINTERROS, OF PITTSBURG, PENNSYLVANIA.

STEAM-TURBINE.

SPECIFICATION forming part of Letters Patent No. 774,715, dated November 8, 1904.

Application filed July 6, 1903. Serial No. 164,743. (No model.)

*To all whom it may concern:*

Be it known that I, CLAES ERIC WINTERROS, a subject of the King of Sweden and Norway, (but having declared my intention of becoming a citizen of the United States,) residing at No. 1229 Greenfield avenue, Pittsburg, in the county of Allegheny and State of Pennsylvania, have invented certain new and useful Improvements in Steam-Turbine Arrangements, of which the following is a specification.

My invention has relation to a steam-turbine arrangement in which there are applied two opposite-acting bucket-ring wheels, one turning concentrically inside the other between two steam-canal casings and in which the steam enters the hollow shaft of one wheel and issues through the hollow shaft of the other.

The object of my invention is in the above arrangement, first, to reduce the speed to the utmost by the use of two multiple bucket-ring wheels turning concentrically in opposite directions; second, for overheated and saturated steam combined to reach the highest possible effect by having the steam proceed radially in outward direction in its action on the buckets (with its expansion) when superheated and then radially inward (with its contraction) when saturated; third, to obtain the advantage of an axially-balanced pressure of the steam in its action upon the motor by using two separate groups of radially-superposed bucket-rings in combination with two separate steam-canal casings; fourth, to obtain the advantage of coupling a driving-shaft for any purpose directly to the inner-motor-wheel shaft by conveying the power of the outer motor-wheel to that of the inner wheel by means of an axially and radially balanced suitable transmission; fifth, to obtain the advantage of having a motor running in the open between two bearings by making those steam-tight and by having canals in said bearings by which the steam can communicate with the hollow shafts of the bucket-wheels; sixth, to obtain an automatic balance of the said bearings by providing a trunnion on each side supported by stationary stands, and an elastic and isolating support by fitting a cap of elastic and non-conductible material between each trunnion and the supporting-frame; seventh, to obtain the advantage of a radially and axially balanced gear transmission from one motor-wheel to the other by placing beveled gearing diametrically on both ends of the motor; eighth, to obtain the advantage of suspending the two motor-wheels in their bearings by providing a transmission which consists of crossed and straight flexible runners in an inclined position upward between two intermediary shafts and the motor-wheels; ninth, to obtain a positive lubrication of the grooves in the motor-wheel bearings (as well as of the bearings themselves) by connecting said grooves or bearings with positive lubrication canals; tenth, to obtain the advantage of a large wearing-surface of the motor-wheel bearings by fitting the motor-wheels so as to be supported both inside and outside of the bearings when turning; eleventh, to obtain the advantage of a large central wearing-surface for the transmission bevel gear-wheels by fitting their hubs in such a manner that they will be supported when turning inside by the extended trunnions of the bearings and outside by stationary stands.

Stated in general terms, my invention consists of a multiple bucket-ring steam-turbine arrangement with two bucket-ring wheels, one turning concentrically inside the other in opposite direction in and between two steam-canal casings provided with axially-balanced central inlet and outlet steam-canals and being in combination with two separate groups of radially-superposed bucket-rings through the concentrically-disposed motor-wheel shafts, which in their turn are provided with suitable means (according to different purposes) for further transmission of the power produced by the steam in its action upon the motor-wheels.

The nature and scope of my invention will be more fully understood from the following description and the accompanying drawings, forming part thereof, and in which—

Figure 1 is a partial side elevation and section of the arrangement for superheated and saturated steam combined. Fig. 2 represents an end elevation of the same. Fig. 3 is a partial section showing the general arrangement of the saturated-steam bucket-rings. Fig. 4 shows a partial section of such an arrangement. Fig. 5 represents a gear transmission from one motor-wheel to the other, and Fig. 6 is an end view of the same. Fig. 7 shows, further, a belt-transmission arrangement from one wheel to the other; and Fig. 8 an end view of the same. Fig. 9 shows a partial section of the motor-wheels and bearing in larger size, with bucket-ring arrangement for superheated and saturated steam combined. Fig. 10 is a partial section showing the arrangement of the first or superheated-steam bucket-rings, and Fig. 11 a partial section of a more completely shown gear-wheel transmission from one motor-wheel to the other in which the motor-wheels are arranged for saturated steam only.

Referring to the drawings as shown in section in Figs. 1, 2, and 9, the apparatus is arranged for superheated and saturated steam combined, with the difference only that in Fig. 9 there are two steam-canals in the bearing—one for inlet and one for outlet—whereas, as in Fig. 1, there is only one canal—for inlet only—as the outlet steam issues here directly from the hollow shaft of the inner wheel. Thus, referring to Fig. 1, A is the inlet-pipe; B, the bearing; C, the supporting-frame; D, the outside motor-wheel, and E the inside motor-wheel. $d'$ and $d'$ are, further, the outside-wheel hollow shaft at each side, $e'$ the inside-wheel hollow shaft at one side for outlet of the steam preferably, and $e^2$ the inside-wheel shaft at the other side, preferably coupled to the driving-shaft. $h$ is, further, a disk attached to each of the said inside-motor-wheel shafts, $h'$ and $h^2$ isolation-mantles attached to the said disk, and $i$, again, a pulley fastened to the same with isolation-mantle between. $i^2$ is, further, an isolation-mantle in which the outside motor-wheel in inclosed, and $i^3$ a pulley fastened to the motor-wheel with the isolation-mantle between. Further, $d^2$ represents ring-shaped tightening-grooves in the periphery of the outside-wheel hollow shafts, in which split packing-rings or their equivalent may be fitted, and $e^3$ represents likewise ring-shaped grooves in the periphery of the inside-wheel shafts, in which similar split packing-rings or their equivalent may be located. Again the outside wheel is composed of three main parts, Figs. 1 and 9, two outside wall parts $d$ and $d$, and an inside part $d^3$, which last is formed like a disk, perforated in its center by a circular opening. Said disk is, further, shaped in its periphery into a circular-flanged part, which fits against a corresponding flange $d^4$ in the periphery of the outer wheel parts $d$ and $d$, and the said three main parts of the outer wheel are thus bolted together with bolts $d^5$.

The inner wheel is constructed as follows: At one side is a hollow shaft $e'$, which, as in Fig. 1, is hollow throughout for the outlet of the steam; but, as in Fig. 9, it is only partly hollow for the outlet of the steam through canal $b'$ in the bearing, this feature in the main being the only difference from that shown in Fig. 1. Referring thus to Figs. 1 and 9, the shaft $e'$ or $e^{100}$ is in its central part formed, first, into a disk $e^4$; secondly, into a number of webs $e^5$ or $e^{50}$, and, thirdly, it continues as a shaft $e^2$ on the other end, which shaft may be hollow, as shown in Figs. 1 and 9, with a bottom or partition $e^6$, forming part of or which continues from the webs $e^5$. (The partition $e^6$ may, however, be dispensed with, so as to take the steam out in both ends of the shaft, if it should be desired.) But $e^2$ may also be made compact without any central opening at all, or $e'$ and $e^2$ may partly or wholly have a central opening to fit on or surround the power-conveying shaft. In both cases, however, $e'$ and $e^2$ are united by the webs or partitions $e^5$ or $e^{50}$, as substantially shown in Figs. 1 and 9. Immediately beyond said webs the shaft $e^2$ is shaped into a shoulder $e^7$, and on that shoulder is fitted a second disk $e^8$, screwed onto $e^7$ by bolts $e^9$. Thus bolted together, disks $e^4$ and $e^8$ will form between themselves a radial disk-shaped opening, with their inner sides as walls to said opening, and, as represented in Figs. 1 and 9, said opening continues smoothly between the webs $e^5$ or $e^{50}$ until it ends with the central canal $e^{11}$ or $e^{110}$ in the hollow shaft $e'$ or $e^{100}$. Hence when thus fitted together the inside wheel will form one single wheel in two parts and the outside wheel one single wheel in three parts. The central disk $d^3$ of the outside wheel can now be placed between disks $e^4$ and $e^8$ before those are connected by bolts $e^9$, and the outside parts $d$ and $d$ of the same wheel can now also be placed on each side of $e^4$ and $e^8$, with their outside flange $d^4$ against the outer flange of disk $d^3$, before parts $d$ and $d$ are connected by bolts $d^5$. On both sides of disk $d^3$, Fig. 9, are further applied a number of concentrically or radially superposed ring-shaped rows of buckets or curved blades $d^6$ $d^7$, &c., including $d^{11}$, and on the inner side of the inner wheel-disks $e^4$ and $e^8$ there are likewise applied a number of ring-shaped rows of buckets or curved blades $e^{12}$ $e^{13}$, &c., including $e^{18}$, and, as may be understood from Figs. 1 and 3, these circular rows of buckets or curved blades can now be made to fit zigzag between each other snugly but freely by turning them in a lathe, and, as may be concluded from the same figures, (especially from Fig. 1,) the said buckets or bucket-rings are thus supposed to fit with the curved border of each blade directly and alternately against the wall of each next wheel part in such way as to keep as tight as possible against leakage when running. Hence all the buckets from $d^6$, including $d^{11}$, fit directly against the inner wall of the disks $e^4$ and $e^8$ of the inner wheel, and all the buckets from $e^{12}$, including $e^{18}$, fit against the central disk $d^3$ of the outer wheel. A more complete way of tightening is, however, shown in Fig. 9, where each bucket row of the outer wheel-disk $d^3$ has an outside wall-ring $d^{12}$, which fits snugly but freely in corresponding ring-grooves in the inner wheel-disks $e^4$ and $e^8$, and each bucket row of the said disks $e^4$ and $e^8$ has likewise an outside wall-ring $e^{19}$, which fits snugly but freely in corresponding ring-grooves in the disk $d^3$. In this way each curved blade or bucket will form a perfect chamber in itself, and no other leakage of the steam can take place but what may pass between the said rings $d^{12}$ and $e^{19}$ and the grooves or walls in and against which they are running. All these bucket-rings together may be called the "saturated-steam bucket-rings," because in these only saturated or moderately-superheated steam should act in order to produce the highest effect in kinetic energy of the steam-jet. On the inner side of each outer wheel part $d$ and $d$, Figs. 1 and 9, are further applied a number of radially-superposed ring-shaped rows of buckets or curved blades $d^{13}$ and $d^{14}$, Figs. 9 and 10, and on the outer side of each inner wheel part or disk $e^4$ and $e^8$ are further applied a number of ring-shaped rows of buckets or bucket-rings $e^{20}$, $e^{21}$, and $e^{22}$. These rows of buckets or bucket-rings can now as well be made to fit zigzag between each other snugly but freely by turning them in a lathe. Each of those bucket rows on the outer wheel parts has likewise an outside wall-ring $d^{15}$, which fits snugly but freely in corresponding ring-grooves in the inside wheel parts $e^4$ and $e^8$, and each bucket-ring of the inside wheel parts $e^4$ and $e^8$ has also an outer wall-ring $e^{23}$, which fits likewise in corresponding ring-grooves in the outside wheel parts $d$ and $d$. This last set of bucket-rings may be called the "superheated-steam bucket-rings," because in these, for the same reason as above, preferably steam in its superheated condition should be the acting agency. The wheels with all their bucket-rings fitted together, as above described, are further placed with their shafts $d'$, $e'$, and $e^2$, &c., snugly fitted into the suitably-supported bearings B and B, together with their packing-rings, in $d^2$ and $e^3$, if such are used. The said bearings are, however, preferably furnished with a trunnion $b'$ on each side, which fits in a corresponding recess in the stands or supports $c$, Figs. 1 and 2. To make the support under the said bearings elastic as well as non-conducting for the heat, the trunnions $b'$ may be provided with a cap $b^2$, of elastic and non-conducting material, which in its turn fits into the said recess of the said stands or supports C. On top of these supports and trunnions a cap $c'$ may be applied in order to secure the bearings to the stands or frames C, as seen in Fig. 2. Thus erected, the apparatus is ready to receive a rotary motion; but for the purpose of disposing the power through the inner motor-wheel shaft only (and in order that the two wheels shall run at the same number of revolutions) it is necessary that both shall be attached to an intermediary transmission. Such transmission is produced either by flexible runners acting against pulleys or the like or by gearing.

In Fig. 7 a belting transmission is shown in which $i^3$ and $i^3$, as above mentioned, are the two pulleys attached directly to the outer wheel D, and $i$ and $i$ are two pulleys attached to the inner-wheel shafts $e'$ and $e^2$. $k$ and $k$ are, further, two intermediary shafts which are provided with pulleys $g'$ and $g^2$, as well as $i^4$ and $i^5$. Pulleys $g'$ and $g^2$ are, further, in running communication with pulleys $i^3$ by means of cross-belts $l$ and pulleys $i^4$ and $i^5$ likewise in communication with pulleys $i$ through the straight belts $m$ and $m'$. It is thus clear that pulleys $i$ and $i^3$ are obliged to run at the same speed (and in opposite directions) by suitable diameters of the respective pulleys, and by placing one shaft at each side the pull on the turbine-wheels will thus be equalized; but, further than that, by arranging the shaft $k$ at a suitable height above the motor, as is shown in Fig. 8, the flexible runners or belts may be arranged in such an angle that the motor in action may as near as possible lift itself (according to the equal weight of the motor-wheels) through its own pull on said flexible runners, thus reducing to the farthert point any pressure or wear in the bearings. It is evident, however, that only one shaft may be placed above the motor for the same purpose, the belts or their equivalents then running perpendicularly.

In Figs. 5 and 6 a bevel-gearing is represented in which $g^3$ is a beveled gear-wheel secured to the extended hollow shaft of the outside motor-wheel, and $i^6$ likewise a beveled gear-wheel secured to the extended shafts of the inside motor-wheel. $b^3$ is, further, an extension or shaft on each side of the bearing $B^{60}$, or rather an extension of its trunnions, as shown in Figs. 1 and 2. On each of these extensions is placed another gear-wheel, $s$ and $s'$, in such way that both $g^3$ and $i^6$ will gear or engage in the same, as seen in Fig. 5. Outside of $s$ and $s'$ the extended trunnions $b^3$ are supported by the stands or frames $c^2$, similar to what is shown in Figs. 1 and 2, and outside of those supports the same extensions are again provided by nuts $g^4$ or their equivalent, whereby the stands or frames $c^2$ may be forced close against the hub of the wheels $s$ and $s'$, so as to take up the end thrust of the same. It is therefore manifest that if one motor-wheel is turned to the right the other must turn to the left, or vice versa. It is also evident that one whole gearing may be placed at only one end; but it is plain that in order to obtain a perfect axial balance one whole gearing should be produced at each end, as shown in Figs. 5 and 6. Likewise it is also evident that by the above arrangement the pressure in the gearing on each side will be perfectly balanced, leaving, therefore, no pressure in the bearing except what corresponds to the weight of the motor-wheels themselves.

In Fig. 11 a more complete drawing of the above-described gearing is shown. In this figure the hubs $s^2$ and $s^3$ of the wheels $s$ and $s'$ are arranged for a second support or bearing for the wheels by being turned down as small as practicable and fitted snugly into the stands or frames $c^3$. By such an arrangement the wheels $s^3$ may bear when turning at the same time on the trunnions $b^3$ by the inside of their hubs, as well as against the frames $c^2$ and $c^3$ by the outside of the same. In Fig. 11 it is also seen that the sleeve $d^{160}$, to which the wheel $g^3$ is secured, extends outside of or around one end of the bearing and that the wheel $i^6$ has as well a sleeve $i^7$, which extends around the other end of the bearing, and it is manifest that said sleeves may also be made to fit snugly around said bearings, so as to increase also in this case the bearing-surface by supporting the motor-wheels when turning both inside and outside of the bearing, if so desired.

It is evident that one power-consumer of equal size—as a dynamo, for instance—may be secured directly on the inner-motor-wheel shaft on one end and on the outer-motor-wheel shaft on the other end of the apparatus without any transmission between the motor-wheels by extending the outer-wheel-shaft beyond the bearing in steam-canal casing on one end and through the bearing on the other end by providing a number of openings in the said outside-motor-wheel shaft on each end, opposite and corresponding to the canals $b^4$, $b^{40}$, and $b^{100}$ for the passage of the steam, and by further providing extra suitable bearings on each end of the inner-motor-wheel shafts, as well as ring-groove packing arrangement, as heretofore described, between inside and outside motor-wheel shafts beyond canals $b^4$, $b^{40}$, and $b^{100}$. If now steam at a suitable superheated condition is let in through a governor-valve to the branch pipe A, Fig. 1, it will follow the direction pointed out by the arrows in Figs. 1, 2, 9, and 10. It enters first through the opening $b^4$ or $b^{40}$ in the bearing B or $B^{12}$ around the hollow shaft $e'$ and $e^2$ or $e^{100}$, &c., on both sides of the wheels, Figs. 1 and 9, and, further, into the ring-shaped canal formed by the space between the outer-wheel hollow shaft $d'$ or $d^{100}$ and the inner-wheel hollow shafts $e'$ and $e^2$ or $e^{100}$. It takes, further, a radial direction outward between inner and outer wheels till it strikes the first bucket-ring $e^{20}$, Figs. 9 and 10, in the following way: In Fig. 10 it is seen by the direction of arrows at the left that bucket-rings $e^{20}$, $e^{21}$, and $e^{22}$ are all turning to the right, whereas $d^{13}$ and $d^{14}$ turn toward the left. It is also seen that the buckets in bucket-ring $e^{20}$ have an entrance direction in this case of about forty-five degrees, or in direction of arrow $z$, Fig. 10, and that all the rest of the buckets up to and including $e^{22}$ have a zigzag curvature from one side to the other. It may now be supposed that through some means the wheels are being put into a rotary motion at the exact velocity corresponding to the pressure of the steam now approaching (in a radial direction and relative to stationary things) bucket-ring $e^{20}$, as pointed out by the arrow Y in Fig. 10. Relative to the wheel (because of the velocity of the same) it will, however, enter bucket-ring $e^{20}$ in the direction pointed out by the line $z$. The entrance of the said buckets is therefore, as said above, also arranged according to the same line Z. The same buckets, however, having a slight curvature to the left will gradually contract, so as to form a jet-opening at the entrance from $e^{20}$ to $d^{13}$. The steam, therefore, because of its much higher velocity than the wheel, notwithstanding that $e^{20}$ is turning toward the right, is now divided in so many jets toward the left as there are buckets in bucket-ring $e^{20}$, and all these steam-jets are now striking in a tangential direction toward the left the buckets in bucket-ring $d^{13}$; but, owing to the abrupt curvature of the buckets in bucket-ring $d^{13}$, the direction of the steam is now turned and again divided in so many jets toward the right as there are buckets in bucket-ring $d^{13}$, which jets are now likewise striking in a tangential direction toward the right the buckets in bucket-ring $e^{21}$. It is manifest that the same action of the steam is now repeated in buckets $e^{21}$, $d^{14}$, and $e^{22}$, with the exception in this last that its outlet is bent only to such a degree that the outlet of the steam (in relation to stationary things) will have a radial direction outward, as pointed out by the arrow Y', though in relation to the wheels it will have a direction as indicated by arrow $z'$. In such radial direction outward it enters, further, the chamber $n$ in the periphery between inner and outer wheels, in which chamber it turns over until it again takes a radial direction inward, and at that point it strikes the first saturated-steam bucket-ring $e^{12}$, Figs. 3 and 9, in the following way: In Fig. 3 it is again seen by the direction of arrows at the right that $e^{12}$ $e^{13}$, &c., including $e^{18}$, are all turning toward the right and that $d^6$ $d^7$, &c., including $d^{11}$, are all turning toward the left, and it is here also seen that the buckets in bucket-ring $e^{12}$ have an entrance direction of about forty-five degrees, as indicated by line $z^2$, Fig. 3, and that all the buckets from $d^6$ down to and including $e^{18}$ have a zigzag curvature from one side to the other. The steam, as above stated, thus approaches (relative to stationary things) the bucket-ring $e^{12}$ in a radial direction inward, as pointed out by the line $Y^2$, but relative to the wheel (because of the velocity of the same) it will now enter bucket-ring $e^{12}$ in the direction according to line $Z^2$. The entrance of the buckets in $e^{12}$ is therefore also arranged according to the direction of the same line $Z^2$. The same buckets, however, having also a slight curvature to the left will gradually contract so as to form a jet-opening at the entrance from $e^{12}$ to $d^6$. The steam, therefore, because of its much higher velocity than the wheel, notwithstanding that $e^{12}$ is turning toward the right, is now divided in so many jets toward the left, as there are buckets in bucket-ring $e^{12}$, and all these steam-jets are now striking in a tangential direction toward the left the buckets in bucket-ring $d^6$; but owing to the abrupt curvature of the buckets in $d^6$ the direction of the steam is now again divided in so many jets toward the right as there are buckets in bucket-ring $d^6$, which jets are now likewise striking in a tangential direction toward the right the buckets in $e^{13}$, and it is again manifest that the same action of the steam is now repeated from bucket to bucket until it reaches the last bucket-row $e^{18}$, from which it issues toward the left, preferably in such an angle that its direction in relation to stationary things becomes radial or tangential to the middle line's helically-bent webs or separating-walls $e^5$ or $e^{50}$, as shown in section on Fig. 3 and indicated in Figs. 1 and 9, and it enters, further, the central chamber $e^{11}$ or $e^{110}$ of the inner-wheel hollow shaft $e'$ or $e^{100}$, respectively, and from there to the open air, to a condenser, or to any other receptacle desired. By looking at the drawings in Figs. 3 and 10 it is seen that all the buckets have their bent or bottom part in the direction to which each wheel is running. It is therefore evident that the steam during all this zigzag or abrupt deviation in its current will also act upon each wheel in such a way as to produce a pressure in each bucket in the same direction, and it is manifest that the sum of all this moving pressure is the work transmitted to the motor by the steam. It is now evident that the superheated-steam bucket-rings may also be located on both sides of disk $d^3$ in combination with saturated-steam bucket-rings arranged substantially as in Fig. 4, if for any case such is preferable, and it is also evident that the saturated steam may have such action upon the buckets in outward direction, as is pointed out in Fig. 10, if such for any purpose should be desired.

In Fig. 11 the wheels are arranged for moderately superheated or saturated steam only in the following way: The central part or shaft of the inner motor-wheel is the same as above described; but the disks $e^{40}$ and $e^{24}$ carry here the buckets on their outside instead of on their inside faces. The central part or shaft of the outside wheel is also substantially the same as above described; but in this case said wheel has no disk $d^3$ connected to its outer part, as shown in Figs. 1 and 9, but carries its bucket-rings on the inside face of the walls $d^{13}$ and $d^{14}$. It is made here in two pieces only and has, therefore, flanges $d^{15}$ at its periphery, screwed together with bolts $d^{16}$, and the inside wheel is made preferably in one single piece. Thus, before bolted together, by putting each of the two parts of the outside wheel on each side of the inside wheel the bucket-rings will fit into each other, as shown in Fig. 4. If now the two parts of the outside wheel are united by bolts $d^{16}$ and the whole mounted in the bearings, as above described, with flexible runners or gear-wheels as conveyers of energy from one bucket-wheel to the other, the motor will then be ready to act; but if the steam shall proceed, here as well, radially inward in its action against the buckets, as in Fig. 4, it is in this case let in through the canal $b^{10}$, Fig. 11, to the canal in the inner-wheel hollow shaft $e^{1100}$. It passes, further, as shown by arrows, the canals between the webs or partition $e^{500}$ to the periphery between the inside and the outside wheel until it enters the buckets at $n'$, as in Fig. 4, and it will now in the same manner act on these buckets as above described in relation to the action of the saturated steam. The bucket-rings, as in Fig. 4, in relation to their superposed condition are therefore marked in the same way as the saturated-steam bucket-rings in Fig. 9, with the exception of a 0 added to each figure. The steam having thus passed said bucket-rings from $e^{120}$, including $e^{180}$, proceeds farther into the canal between the inner and outer wheel hollow shafts and issues at last through canal $b^{400}$ in the bearing.

It is manifest that by leaving out the superheated-steam bucket-rings in Fig. 9 the motor, as shown in this figure, may also be used for saturated steam only; but it is plain that the last-described method of placing the bucket-rings is the simpler. Another advantage is also obtained by this arrangement. By looking at the drawings in Fig. 11 it is readily seen that the steam may be let in (by means of canal $b^{10}$ in the bearing through canal $e^{1100}$ in the shaft) only at one end of the motor and still having the quality of being axially balanced, whereas the outlet $b^{400}$ in order to be axially balanced must be situated on both ends of the motor. Again by looking at the drawings in Fig. 9 it is seen that the inlet through canal $b^{40}$ must be situated on both sides to be axially balanced, whereas in this case the outlet through canal $e^{110}$ and $b'$ may be located only on one end of the motor.

The webs or partitions $b^{50}$, Fig. 9, to be correct should be helically bent in the opposite way to the webs $e^5$ and $e^{50}$, Figs. 3 and 9; but they may, especially for the smaller motors, be made radial, as indicated in the drawings. The webs $b^{500}$ and $e^{500}$ may also be radially disposed, as shown in Fig. 11; but to be correct they should also be helically bent, so as not to interfere with the radial motion of the steam in relation to stationary things.

To secure a steam-tight running joint of the motor-wheel shafts in their bearings a steam-tight running fit may be applied, in combination with a number of circular grooves in the periphery of the shaft located nearest to the steam, with the highest pressure which passes through canals in the bearing, so as to catch and condense into water the steam which is leaking, and said water when filling the grooves will thus lock the passage of the steam and serve as packing; but, especially for large motors, a more efficient packing arrangement may, however, be applied, consisting of a number of metallic packing-rings $d^2$ and $e^3$, split in one part of their periphery and further located and fitted into the above-named grooves similar to the packing-rings in an engine-piston, Figs. 1, 9, and 11, or, particularly when low pressure is used, whole packing-rings of a softer material may be applied, especially at the outlet or vacuum side, because of the necessary low temperature.

To oil the bearings around the shafts $d'$ $e'$ $e^2$, &c., small pipes $p$ and $p$, Figs. 1, 9, and 11, are introduced in the periphery of the bearings B, B$^{12}$, and B$^{120}$, and the lubrication matter forced through a small opening or canal into the above-named grooves in the motor-wheel shafts and from there throughout the whole joints between bearing and shaft.

In order to be able to use flexible runners or belting in immediate connection with the motor, the outside wheel is first provided with a ring-shaped mantle $i^2$, of any suitable non-conductible material for the heat, and on the outside of this isolating mantle the pulley $i^3$ is now secured to the wheel by means of screws $i^8$ or their equivalent. On the inside-wheel hollow shaft $e'$ the disk $h$ is further suitably secured, and outside of this is likewise placed a ring-shaped isolation-mantle $h'$ and again a second mantle $h^2$ on the other side of $h$ in such way that $h'$ and $h^2$ will surround the disk $h$, and on the outside of mantle $h^2$ the pulley $i$ is now also secured to disk $h$ by bolts $i^9$ or their equivalent. The bearing B is further surrounded by an isolation-mantle $b^5$, secured to the bearing by suitable means. It is thus seen that in this case both stationary and moving parts of the motor are almost thoroughly inclosed by isolation material. Hence very little heat is lost, whereby it is possible to use even leather belting or other material (easily effected by heat) as conveyer of energy.

I am aware that gear transmissions from one motor-wheel to the other have been made and described in relation to steam-turbines of other constructions; but none appears to give to the motor the condition of being at the same time radially and axially balanced.

It is evident that certain details of the construction may be changed from those shown in the accompanying drawings without interfering with the main combinations, which I claim as my invention. Especially will this be the case in the construction of the motor-wheels, of which the mode, as shown in the drawings, is only represented as means of conveniently describing my method of arranging a radially and axially balanced distribution of the steam-pressure in its action on the wheels, by two groups of radially-superposed bucket-rings in each of two concentrically-disposed and opposite-acting motor-wheels, and in relation to the conveying of energy between the motor-wheels it is further understood that any other flexible runner or gearing transmission, which will fill its functions in the claim 1 combination, as above described, must be considered as a construction or invention in itself, having only a faculty of being applied to this patent—such as, for instance, the gear transmission in the present drawings, described, but not claimed. It is also evident that the special construction of the radially-superposed buckets, consisting of a half-bent high-pressure row in combination with a number of double-bent descending-pressure bucket-rows is of great importance, because, as designated by the arrows in Figs. 3 and 10, the bucket-rows $e^{20}$ and $e^{12}$ are both running against the steam-pressure for the sake of gathering up the same, so as to correctly start and distribute it to the next wheel, and that the other bucket-rows are all double bent and running away from the steam, so as to receive part of its energy when rebending it for further distribution to the next wheel, and so on. This special shape of buckets, in combination with a special place and action in the wheel for a certain purpose, I claim to be an original construction, and therefore patentable.

Having thus described the nature and subject of my invention, what I claim as new, and desire to secure by Letters Patent, is—

1. The combination in a steam-turbine of two radially-superposed bucket-ring wheels one surrounding the other and turning in opposite directions; the inside wheel running in and between two steam-tight bearings, the outside wheel inclosing the same, running in the open and supported by the same bearings; an axially-balanced central inlet and outlet for the steam, consisting of two separate steam-canal casings, each having a cylindrical chamber surrounding the ends of both of the concentrically-disposed shafts of the inner and outer motor-wheels, substantially as and for the purpose described.

2. The combination in a steam-turbine of two radially-superposed bucket-ring wheels one surrounding the other and turning in opposite directions; the inside wheel running in and between two steam-tight bearings, the outside wheel inclosing the same, running in the open and supported by the same bearings; an axially-balanced central inlet and outlet for the steam, consisting of two separate steam-canal casings, each having a cylindrical chamber surrounding the ends of both of the concentrically-disposed shafts of the inner and outer motor-wheels, and means for transmitting energy from the two motor-wheel shafts, substantially as and for the purpose described.

3. The combination in a steam-turbine of two radially-superposed bucket-ring wheels one surrounding the other and turning in opposite directions; the inside wheel running in and between two steam-tight bearings, the outside wheel inclosing the same, running in the open and supported by the same bearings; an axially-balanced central inlet and outlet for the steam, consisting of two separate steam-canal casings, each having a cylindrical chamber surrounding the ends of both of the concentrically-disposed shafts of the inner and outer motor-wheels, and means for a radially and axially balanced transmission of power from one motor-wheel to the other, substantially as and for the purpose described.

4. The combination in a steam-turbine of two radially-superposed bucket-ring wheels one surrounding the other and turning in opposite directions; the inside wheel running in and between two steam-tight bearings, the outside wheel inclosing the same, running in the open and supported by the same bearings; an axially-balanced central inlet and outlet for the steam, consisting of two separate steam-canal casings each having a cylindrical chamber surrounding the ends of both of the concentrically-disposed shafts of the inner and outer motor-wheels, and a radially-balanced transmission of power from one motor-wheel to the other, consisting of crossed and straight flexible runners on pulleys secured to the motor-wheels and to a counter-shaft on each side of the motor, substantially as and for the purpose described.

5. The combination in a steam-turbine of two radially-superposed bucket-ring wheels one surrounding the other and turning in opposite directions; the inside wheel running in and between two steam-tight bearings, the outside wheel inclosing the same, running in the open and supported by the same bearings; an axially-balanced central inlet and outlet for the steam, consisting of two separate steam-canal casings each having a cylindrical chamber surrounding the ends of both of the concentrically-disposed shafts of the inner and outer motor-wheels, and a radially-balanced transmission of power from one motor-wheel to the other, consisting of crossed and straight belting on pulleys secured to the motor-wheels and a counter-shaft on each side of the motor, substantially as and for the purpose described.

6. The combination in a steam-turbine of two radially-superposed bucket-ring wheels one surrounding the other and turning in opposite directions; the inside wheel running in and between two steam-tight bearings, the outside wheel inclosing the same, running in the open and supported by the same bearings; an axially-balanced central inlet and outlet for the steam, consisting of two separate steam-canal casings, each having a cylindrical chamber surrounding the ends of both of the concentrically-disposed shafts of the inner and outer motor-wheels; and means for suspending the motor in its bearings through its own action on flexible runners, substantially as and for the purpose described.

7. The combination in a steam-turbine of two motor-wheels one inclosed in the other and turning in opposite directions; the inside wheel running in and between two steam-tight bearings, the outside wheel inclosing the same and supported by the same bearings; and axially-balanced distribution of the steam-pressure in the wheels by means of two groups of radially-superposed bucket-rings, each separately connected at each end with the hollow motor-wheel shafts and a central steam-canal casing surrounding the ends of said motor-wheel shafts, substantially as and for the purpose described.

8. The combination in a steam-turbine of two concentrically-superposed bucket-ring wheels, one inclosed in the other and running in opposite directions; the inside wheel running in and between two steam-tight bearings, the outside wheel inclosing the same and supported by the same bearings; two groups of radially-superposed bucket-rings for the superheated steam, and two groups of radially-superposed bucket-rings for the saturated steam; and a mutual connection of same with the hollow motor-wheel shafts and with a steam-canal casing at each end surrounding and supporting both of the concentrically-disposed motor-wheel shafts, substantially as and for the purpose described.

9. The combination in a steam-turbine of two concentrically-superposed bucket-ring wheels, one inclosed in the other and running in opposite directions; a mantle of non-conductible material surrounding the outside wheel; a pulley attached on each side of the motor-wheel with the isolation-mantle between; an axially-balanced central inlet and outlet for the steam in a steam-canal casing on each end of the motor-wheels, serving as support and bearings for the wheels by surrounding both ends of the concentrically-disposed motor-wheel shafts; an isolated mantle surrounding said casings; a disk attached to each end of the inner motor-wheel shaft; an isolation-mantle on each side of the said disks, and a pulley fastened on each of said disks with the isolation-mantle between, substantially as and for the purpose described.

10. The combination in a steam-turbine of two concentrically-superposed bucket-ring wheels, one inclosed in the other and running in opposite directions; an axially-balanced central inlet and outlet for the steam in a steam-canal casing on each end of the motor-wheels serving as support and bearings by surrounding both of the concentrically-disposed inner and outer motor-wheel shafts; a balancing-trunnion attached to each side of said casings; a cap of elastic and non-conductible material for the heat on said trunnions; and a stationary support under said trunnions with the said caps between, substantially as and for the purpose described.

11. The combination in a steam-turbine of two concentrically-superposed bucket-ring wheels, one inclosed in the other and running in opposite directions; an axially-balanced central inlet and outlet for the steam by a steam-canal casing on each end of the motor-wheel; a cylindrical bearing in said casings surrounding both of the concentrically-disposed inner and outer motor-wheel shafts; and an outside bearing-surface arrangement consisting of a sleeve (in direct connection with each of the outside and inside motor-wheel shafts) inclosing each end of the bearing so as to serve as an additional outside bearing-support during the action of the wheel, substantially as and for the purpose described.

12. The combination in a steam-turbine of two concentrically-superposed bucket-ring wheels, one inclosed in the other and running in opposite directions; an axially-balanced central inlet and outlet for the steam by a steam-canal casing on each end of the motor-wheels; a cylindrical bearing in said casings surrounding both of the concentrically-disposed inner and outer motor-wheel shafts; a packing arrangement in said bearings, consisting of a number of grooves in the motor-wheel shafts, and means in said grooves for checking the passage of the steam, substantially as and for the purpose described.

13. The combination in a steam-turbine of two concentrically-superposed bucket-ring wheels; one inclosed in the other and running in opposite directions; an axially-balanced central inlet and outlet for the steam by a steam-canal casing on each end of the motor-wheels; a cylindrical bearing in said casings surrounding both of the concentrically-disposed inner and outer motor-wheel shafts; a number of ring-grooves in the motor-wheel shafts for packing; and a lubrication arrangement consisting of canals, communicating with said grooves and bearings and with positive lubrication-pipes, substantially as and for the purpose described.

14. The combination in a steam-turbine of two concentrically-superposed bucket-ring wheels; one inclosed in the other and running in opposite directions; an axially-balanced central inlet and outlet for the steam by a steam-canal casing on each end of the motor-wheels; a cylindrical bearing in said casings surrounding both of the concentrically-disposed inner and outer motor-wheel shafts; and a power-conveying arrangement without transmission between motor-wheels, consisting of an elongation of the outside motor-wheel shaft outside of its bearings, openings in said shaft which communicate with the steam-canals in steam-canal casings, and an outside special bearing supporting the inside motor-wheel shaft, substantially as and for the purpose described.

15. In a steam-turbine of two concentrically-superposed bucket-ring wheels running in opposite directions; the combination of two radially-superposed bucket-ring groups, consisting of a half-bent high-pressure bucket-row running against the steam for gathering up its pressure, and a number of double-bent bucket-rows running away from the steam for further distributing its energy, substantially as and for the purpose described.

CLAES ERIC WINTERROS.

Witnesses:
CHR. KRÜM,
E. G. HELANDER.